(12) United States Patent
Edwards

(10) Patent No.: US 10,142,109 B2
(45) Date of Patent: Nov. 27, 2018

(54) INSTANTIATING CONTAINERS

(71) Applicant: HEWLETT PACKARD ENTERPRISE DEVELOPMENT LP, Houston, TX (US)

(72) Inventor: Nigel Edwards, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 296 days.

(21) Appl. No.: 15/238,562

(22) Filed: Aug. 16, 2016

(65) Prior Publication Data

US 2018/0054314 A1 Feb. 22, 2018

(51) Int. Cl.
*H04L 9/32* (2006.01)
*G06F 11/07* (2006.01)
*G06F 21/00* (2013.01)
*G06F 21/64* (2013.01)

(52) U.S. Cl.
CPC .......... *H04L 9/3242* (2013.01); *G06F 11/079* (2013.01); *G06F 11/0721* (2013.01); *G06F 11/0751* (2013.01); *G06F 11/0787* (2013.01); *G06F 21/00* (2013.01); *G06F 21/64* (2013.01)

(58) Field of Classification Search
CPC ..... H04L 9/3242; G06F 21/64; G06F 11/0787
USPC ......................................................... 713/170
See application file for complete search history.

(56) References Cited

U.S. PATENT DOCUMENTS

| | | | |
|---|---|---|---|
| 8,219,545 B2* | 7/2012 | Jaffe | G06F 21/64 707/711 |
| 9,075,638 B2 | 7/2015 | Barnett et al. | |
| 2004/0199508 A1* | 10/2004 | Radatti | G06F 21/56 |
| 2004/0220975 A1* | 11/2004 | Carpentier | G06F 17/30097 |
| 2009/0254530 A1* | 10/2009 | Jaffe | G06F 21/64 |
| 2016/0098578 A1* | 4/2016 | Hincker | G06F 21/64 726/26 |
| 2016/0125059 A1* | 5/2016 | Jain | G06F 3/0619 707/639 |

OTHER PUBLICATIONS

Bartock, M., et al., Devops and Container Security, NIST, Sep. 18, 2015, 41 pages.
Unknown, Linux Containers Streamline Virtualization and Complement Hyperviser-based Virtual Machines, White Paper, Intel, Oct. 3, 2014, 12 pages.
Wheeler, D.A., Cloud Security: Virtualization, Containers, and Related issues, Feb. 8, 2016, Essays, 14 pages.
Xia, M., et al., Enhanced Privilege Separation for Commodity Software on Virtualized 4 Platform, Shanghai Jiao Tong University, Jun. 15, 2010, 8 pages.

* cited by examiner

*Primary Examiner* — Teshome Hailu
(74) *Attorney, Agent, or Firm* — Hewlett Packard Enterprise Patent Department

(57) ABSTRACT

Example embodiments relate to instantiating containers. For example, in an embodiment, integrity of a container image may be verified by executing a verification program using verification information associated with the container image. Provenance of the container image may be verified by checking a log associated with the container image. A container may be instantiated from the container image by loading a file system associated with the container image. The file system associated with the container image may be isolated from the verification information and the log.

16 Claims, 4 Drawing Sheets

INSTANTIATING CONTAINERS

BACKGROUND

Containers are paradigms for developing and deploying computer services. Developers and operators value containers because containers may encapsulate dependencies for running a service inside a single entity.

BRIEF DESCRIPTION OF THE DRAWINGS

The following detailed description references the drawings, wherein.

DETAILED DESCRIPTION

Figure 1:
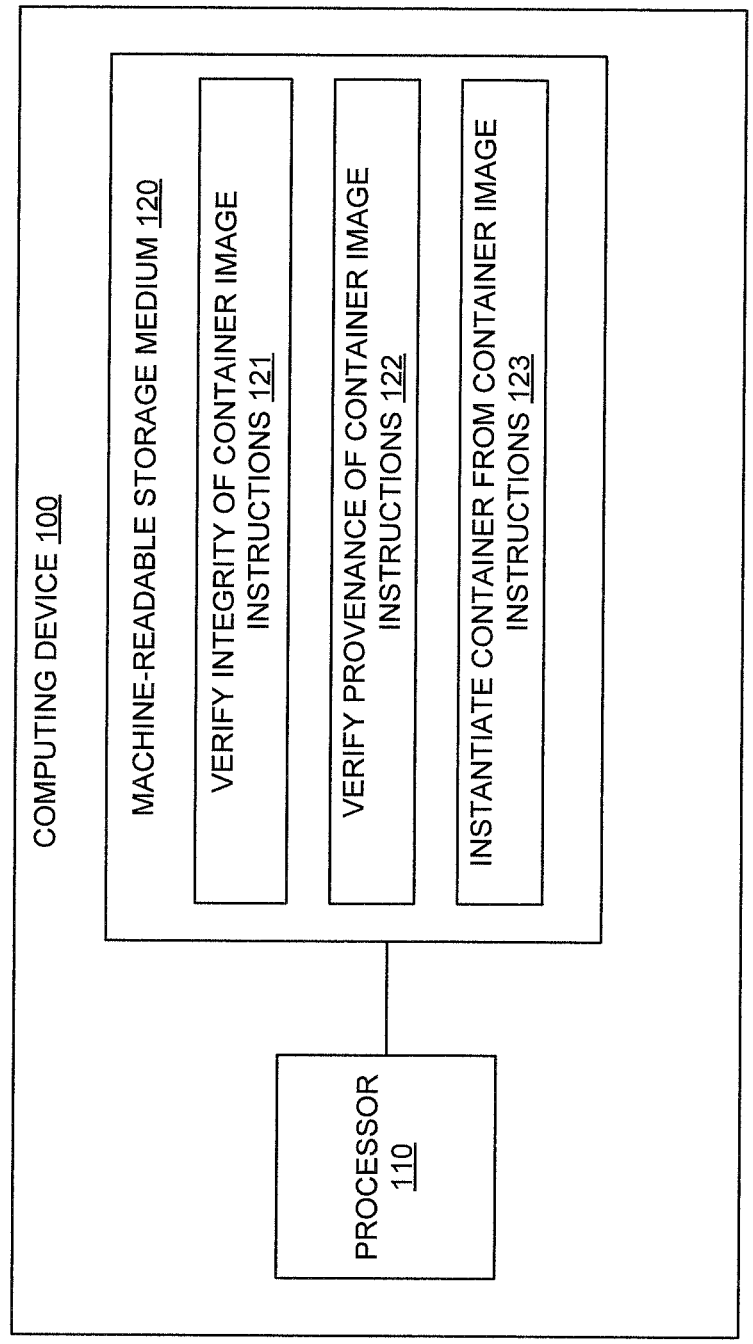
FIG. 1 is a diagram of a first example computing device for instantiating containers.

Containers are paradigms for developing and deploying computer services. Developers and operators value containers because dependencies for running a service are encapsulated inside a single entity. Containers may be useful for transporting a service from a development environment to an operating environment. Furthermore, multiple containers may share a physical machine without conflict because differences in libraries and configuration may be encapsulated within each container. Containers may efficiently utilize resources and may be easier to manage than virtual machines because there may be a single operating system per physical machine. Thus, a container-based system may involve fewer operating systems for an administrator to manage and fewer redundant processes since there is only a single kernel per machine and a single set of operating system services (daemons).

A container may include a container image. A container image may be a file system hierarchy which may be copied to create the file system hierarchies for a running container. Thus, multiple running containers may be created from an image. In some instances, containers can be instantiated on multiple machines at different times and locations. For example, multiple devices may be connected in a network, where the devices may be served by a storage system under a global namespace for containers.

Prior to executing, a correctness of a container may be verified by an assurance measure, which may verify the security of a container image and a container. Assurance of a container or container image is the process of checking the container or image against a set of known criteria to give confidence that it is in an intended state. Thus the container may deliver the intended service and without being compromised. Compromise includes, but is not limited to, corruption or destruction of data, disabling of services, installation of new services, "backdoors" to allow exfiltration of data, and updates to configuration files to critical services such as "ssh" to allow an attacker to access the container and therefore the programs and data within the container.

However since containers can be instantiated on multiple devices, the data and code associated with the assurance measure may be used wherever and whenever the container image is copied and the container is instantiated. Furthermore, adversaries attempting to compromise the container or a service in the container to steal data or interfere with its execution may often attempt to conceal evidence of their activities by editing or removing log files, updating, removing, or disabling any mechanism or database used for assurance.

Examples disclosed herein address these technical challenges by providing isolated assurance mechanisms for verifying the security of container images and containers, where the programs and code to assure the image or container are part of the file system hierarchy. Thus, information for verifying the security of the container can travel wherever the container image is copied. For example, a user constructing a container image can also construct assurance mechanisms. As a result, any instance of a container from the image may have verification information put in place by the image creator.

An example computing device disclosed herein may have a non-transitory computer-readable storage medium storing instructions to verify an integrity of a container image by executing a verification program using verification information associated with the container image. The storage medium may store instructions to verify a provenance of the container image by checking a log associated with the container image. The storage medium may further store instructions to instantiate a container from the image container image by loading a file system associated with the container image, where the file system associated with the container image is isolated from the verification information and the log. In this manner, examples herein provide mechanisms for isolating the assurance checking measures from the services running within a container. Thus, the assurance checking measures may be run outside of the container, possibly on remote machines to provide assurance that the container is operating correctly, and may be protected from tampering by the running services in the container or other containers.

Referring now to the drawings, FIG. 1 depicts an example computing device 100 for instantiating containers. Computing device 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 1, computing device 100 includes a processor 110 and a non-transitory machine-readable storage medium 120 encoded with instructions to instantiate containers.

Processor 110 may be one or more central processing units (CPUs), semiconductor-based microprocessors, microcontrollers, digital signal processors, state machines, logic circuitries, virtual machines, and/or other hardware devices suitable for retrieval and execution of instructions stored in machine-readable storage medium 120. Processor 110 may fetch, decode, and execute instructions 121, 122, 123, and/or other instructions to implement the procedures described herein. As an alternative or in addition to retrieving and executing instructions, processor 110 may include one or more electronic circuits and/or dedicated hardware that include electronic components for performing the functionality of one or more of instructions 121, 122, and 123.

In an example, the program instructions 121, 122, 123, and/or other instructions can be part of an installation package that can be executed by processor 110 to implement the functionality described herein. In such a case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any electronic, magnetic, optical, or other physical storage device that contains or stores executable data accessible to computing device 100. Thus, machine-readable storage medium 120 may be, for example, a Random Access Memory (RAM), an Electrically Erasable Programmable Read-Only Memory (EEPROM), a storage device, an optical disc, and the like. Storage medium 120 may be a non-transitory storage medium, where the term "non-transitory" does not encompass transitory propagating signals. Storage medium 120 may be located in computing device 100 and/or in another device in communication with computing device 100. As described in detail below, machine-readable storage medium 120 may be encoded with verify integrity of container image instructions 121, verify provenance of container image instructions 122, and instantiate container from container image instructions 123.

Instructions 121, responsive to being executed by processor 110, may verify an integrity of a container image by executing a verification program using verification information associated with the container image. A container image may be a file system hierarchy which may be copied to create the file system hierarchies for a running container. A container image may thus include a single file path or a complex directory hierarchy, and may be stored in a distributed storage system having multiple storage nodes. A container may be an environment inside which executing processes are encapsulated.

To verify the integrity of a container image, instructions 121 may verify its security and that all code, libraries, configurations, and data file are in a known good state. A verification program may be executed using verification information associated with the container image. The verification program may be executed by computing device 100 or by a remote node with a second processor. For the latter, a distributed file system may be used to manage a network of nodes and storage domains where container images, file systems, and files are stored.

Verification information may include data and code that may be created by an administrator corresponding to when the administrator created the container image. The verification information may be used to subsequently verify the integrity of the container image by the verification program. For example, a golden image of the container image may include verification information that was created when the image was created. To prevent tampering, the mount point for the container is a separate directory from the files and directories of the verification information. This conception is illustrated in more detail herein in relation to FIG. 3.

For code and libraries which are not intended to change during normal operation, verification may be accomplished by taking a cryptographic hash of the files of the verification information associated with the container image and verifying the hashes against a database of correct hashes. For example, if an adversary changes the file, the cryptographic hash will change and the verification may fail. Deletion of critical files can also be detected, by the absence of a file in the files system that is recorded in the database. The presence of a new and possibly dangerous file can be detected, by noting whether or not it is in the database. As an example, this may be in a directory that is not expected to change, such as /bin within the running container, or /image-root/root/bin from outside the container.

The files and directories protected and monitored may be determined by a combination of manual and automated measures. For example, administrators may decide that the configuration files for certain services should be immutable and that no new executables should be placed in /bin. As a specific example, a combination of the Linux/Unix "find.-type f-executable" and "file" commands may be used to find most executable files and library files within a container and then to take the cryptographic hash of these files to ensure that they are not changed. In some examples, the hash database may be called /image-root/_cos_hashes.

Continuing to refer to FIG. 1, instructions 122, responsive to being executed by processor 110, may verify a provenance of the container image by checking a log associated with the container image. A provenance of a container image may indicate an origin for the container image. The provenance of the container image may be verified by checking the log, which may include an execution history that can be traced back to the origin of the container image. As with the verification information, to prevent tampering, the mount point for the container may be a separate directory from the files and directories of log. This conception is illustrated in more detail herein in relation to FIG. 3.

In some examples, a container runtime mechanism (e.g., Docker) may record events in a log file that is part of the container, but outside the running file system. For example, storage drivers may log events such as mount and unmount that occur each time a container is created, instantiated, or stopped, and may be stored in a file log, such as in a file/image-root/_cos_log. Checking that data is in the right format, such as not including unencrypted personally identifiable information, is an example of policy specification and enforcement. Another example is code and data which enforces network security policy. In some examples, to protect the assurance code and data from tampering on specific nodes on which a container is running, an underlying distributed file system may render all or part of the file system read-only to all but designated nodes. By virtue of the read-only status, the node on which containers are executing is unable to change assurance code and data, except perhaps append to logs. Thus, in some examples, the processor 110 prevents modifying the verification information and the log.

Instructions 123, responsive to being executed by processor 110, may instantiate a container from the container image by loading a file system associated with the container image. The file system associated with the container image may be isolated from the verification information and the log. Instantiating the container may include loading the files and data of the container image in order to execute services and processes of the container.

As described previously, the mount point for the container is a separate directory from the files and directories of the verification information and the files and directories of the log. In some examples, instructions 123 may instantiate the container in response to a positive verification of the integrity of the container image by instructions 121 and in response to a positive verification of the provenance of the container image by instructions 122. Therefore, instructions 123 may not instantiate the container unless it receives a notification that the verification of the integrity of the container image and the verification of the provenance of the container image were positive.

Furthermore, in some examples, computing device 100 may continue to monitor the container after the container has been instantiated. Accordingly, computing device 100 may continuously or regularly run the verification program to verify the integrity of the container image, and/or it may continuously or regularly check the log to verify the provenance of the container image.

In this manner, examples herein provide a tight coupling of assurance data and mechanisms with the container image and secure isolation so that assurance data cannot be tampered with by any service execution in the container, even when the service may be under attack and/or has been compromised, by virtue of the assurance code and data being part of the container file system but outside of the mount point. Thus the assurance data travels with the image and container whenever the image or container is copied or migrated.

Figure 2:
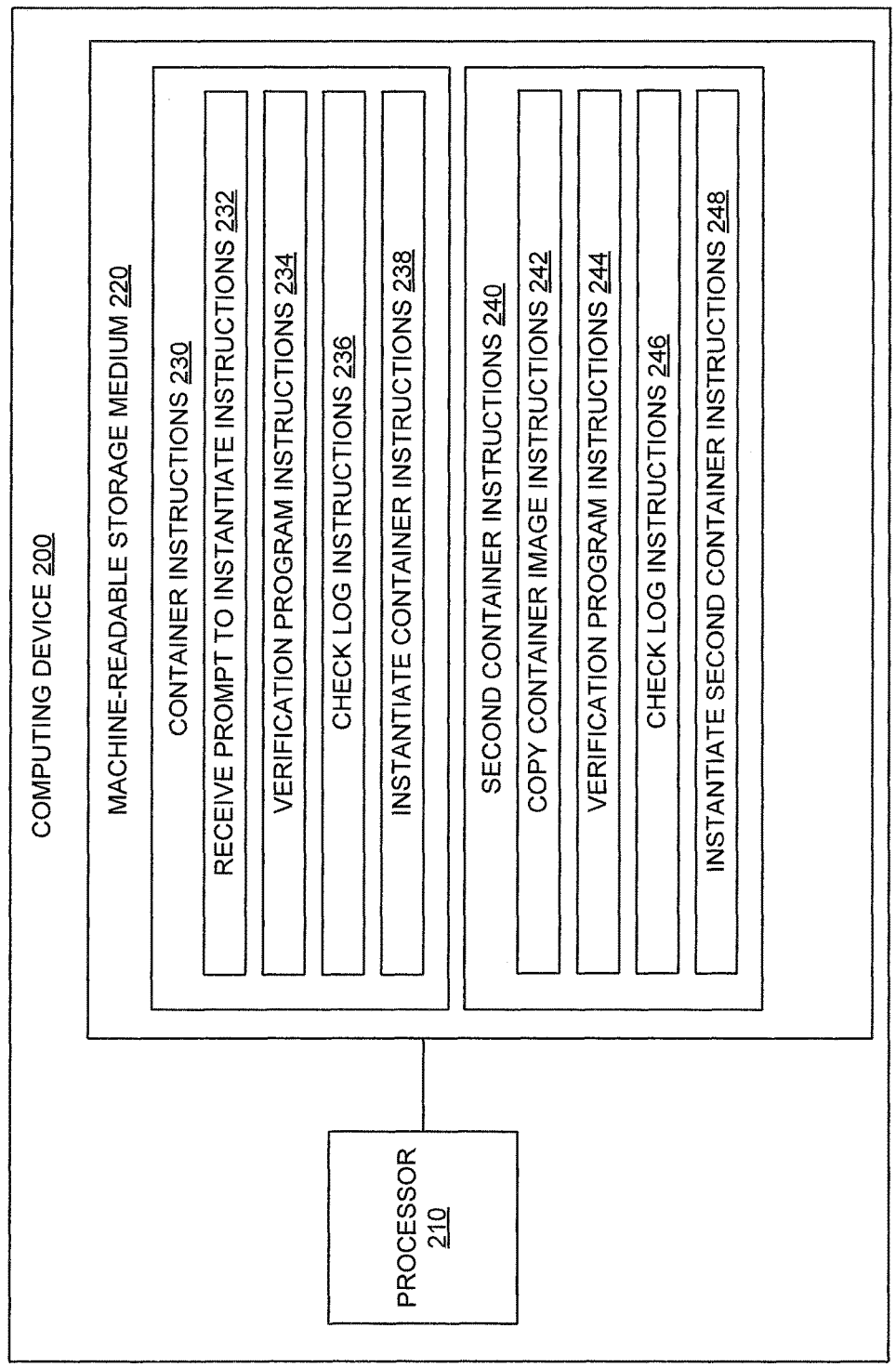
FIG. 2 is a diagram of a second example computing device for instantiating containers and second containers.

FIG. 2 depicts a second example computing device 200 for instantiating containers and second containers. As described previously, an example device may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. Non-transitory machine-readable storage medium 220 may be encoded with instructions to instantiate containers.

The example computing device may also include a processor 210, which may be one or more central processing units (CPUs), semiconductor-based microprocessors, and/or other hardware devices suitable for retrieval and execution of instructions stored in machine-readable storage medium 220. The processor may fetch, decode, and execute instructions 230, 240, and/or other instructions to implement the procedures described herein.

Container instructions 230 and the instructions it contains may instantiate a container in response to verifying the integrity of a container image and verifying the provenance of the container image. Container instructions 230 may include receive prompt to instantiate instructions 232, verification program instructions 234, check log instructions 236, and instantiate container instructions 238.

Instructions 232, responsive to being executed by processor 210, may receive a prompt to instantiate a container from a container image. The container image may be a file system hierarchy which may be copied to create the file system hierarchies for a running container. A container image may thus include a single file path or a complex directory hierarchy, and may be stored in a distributed storage system having multiple storage nodes. A container may be an environment inside which executing processes are encapsulated. The prompt to instantiate a container may be received from various sources, including a user prompt from a remote device or an automatic request from a device.

Instructions 234, 236, and 238 may be analogous to instructions 121, 122, and 123 of computing device 100 of FIG. 1, respectively. As described above, instructions 234 may verify an integrity of a container image by executing a verification program using verification information associated with the container image, instructions 236 may verify a provenance of the container image by checking a log associated with the container image, and instructions 238 may instantiate a container from the container image by loading a file system associated with the container image.

Container instructions 240 and the instructions it contains may instantiate a second container in response to verifying the integrity of a second container image and verifying the provenance of the second container image. Container instructions 240 may include receive copy container image instructions 242, verification program instructions 244, check log instructions 246, and instantiate second container instructions 248.

Copy container image instructions 242, responsive to being executed by processor 210, may copy the container image to a second container image. For example, upon receiving a prompt to instantiate a second container, instructions 242 may clone the container image used to instantiate the container by instructions 230 to the second container image. Copying the container image may include creating a second copy of the file system hierarchy of the container image. The second copy may also include the verification information and the log of the container image, which may be isolated from the mount point of the container image. Responsive to copying the container image to a second container image, a second container may be instantiated from the second container image.

Accordingly instructions 244 may verify an integrity of the second container image by executing a verification program using verification information associated with the second container image, instructions 246 may verify a provenance of the second container image by checking a log associated with the second container image, and instructions 248 may instantiate a second container from the second container image by loading a file system associated with the second container image.

In some examples, the first container may be isolated from the second container and vice versa. For example, the first container and the second container may be hosted on different nodes of a network of devices. In another example, the first and second containers may be isolated by a kernel structure of an operating system.

Figure 3:
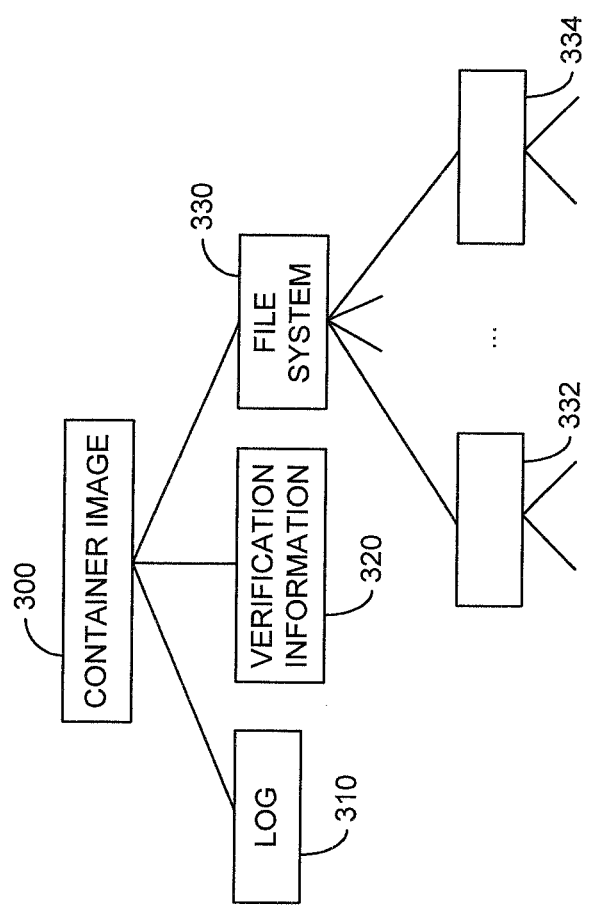
FIG. 3 is a diagram of an example illustration of a file hierarchy for a container image.

FIG. 3 provides an example illustration of a file hierarchy for a container image 300. Container image 300 may have a file hierarchy that allows for isolated assurance measures. As described previously herein, a mount point for the container file system 330 may be a separate directory from the files and directories of the verification information 320 and of the log 310.

As illustrated in FIG. 3, a container image 300 may include a hierarchy of log 310 310 associated with the container image 300, verification information 320 associated with the container image 300, and file system 330 associated with the container image 300. Upon a prompt to instantiate a container from container image 300, log 310 may be checked to verify a provenance of container image 300 and verification information 320 may be used by a verification program to verify the integrity of container image 300. File system 330 may be loaded to instantiate a container, and may include a hierarchy of files including directories 332 and 334.

Log 310, verification information 320, and file system 330 may be isolated by the use of a file system mount point. For example, all files and directories below a mount point may be loaded when instantiating a container. For instance, file system 330 and all child directories of file system 330 may be loaded when a container is instantiated. On the other hand, log 310 and verification information 320 may be unaffected by any running instances of the container. As an example, the following file hierarchy may be used in some examples:

| | |
|---|---|
| /image-root | <- root of image and container file system hierarchy |
| /image-root/root | <- mount point of file system for a running container |
| /image-root/ assurance_dir | <- assurance data and code |

In the example shown above, log 310 and verification information 320 may be stored in /image-root/assurance_dir while file system 330 may be stored under the mount point in/image-root/root. In some examples, there may be multiple different assurance directories or files.

Figure 4:
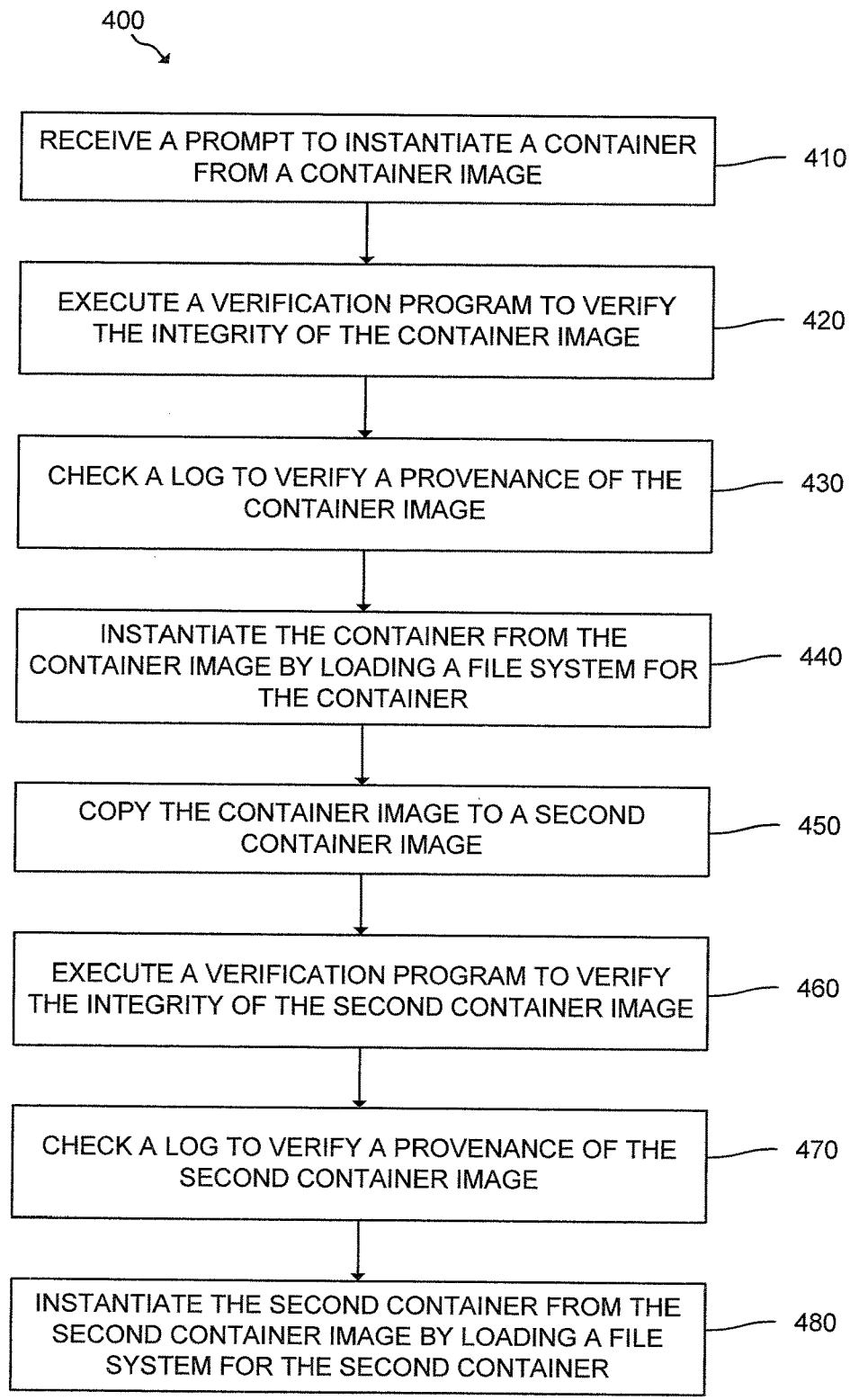
FIG. 4 is a flowchart of an example method for instantiating containers.

Referring now to FIG. 4, example method 400 illustrates instantiating containers and second containers. Although execution of method 400 is described below with reference to the examples illustrated in FIGS. 1, 2, and 3, other suitable devices for execution of this method should be apparent. Method 400 may be implemented in the form of executable instructions stored on a machine-readable storage medium and/or in the form of electronic circuitry.

In an operation 410, a prompt to instantiate a container from a container image may be received. The container image may be a file system hierarchy which may be copied to create the file system hierarchies for a running container. A container image may thus include a single file path or a complex directory hierarchy, and may be stored in a distributed storage system having multiple storage nodes. A container may be an environment inside which executing processes are encapsulated. The prompt to instantiate a container may be received from various sources, including a user prompt from a remote device or an automatic request from a device.

In an operation 420, a verification program may be executed using verification information associated with the container image to verify an integrity of the container image. For example, to verify the integrity of the container image, its security and all code, libraries, configurations, and data file associated with the image are in a known good state. A verification program may be executed using verification information associated with the container image.

In an operation 430, a log associated with the container image may be checked to verify a provenance of the container image. The provenance of the container image may indicate an origin for the container image. The provenance of the container image may be verified by checking the log, which may include an execution history that can be traced back to the origin of the container image.

In an operation 440, the container may be instantiated from the container image by loading a file system associated with the container image. The file system associated with the container image may be isolated from the verification information and the log as described in relation to FIG. 3. Instantiating the container may include loading the files and data of the container image in order to execute services and processes of the container. In some examples, operation 440 may instantiate the container in response to a positive verification of the integrity of the container image in operation 420 and in response to a positive verification of the provenance of the container image in operation 430. Therefore in some examples, operation 440 may not instantiate the container unless it receives a notification that the verification of the integrity of the container image and the verification of the provenance of the container image were positive.

In an operation 450, a second container image may be copied from the container image. For example, upon receiving a prompt to instantiate a second container, the container image used to instantiate the container may be cloned to the second container image. Copying the container image may include creating a second copy of the file system hierarchy of the container image. The second copy may also include the verification information and the log of the container image, which may be isolated from the mount point of the container image.

Accordingly, in an operation 460, a verification program may be executed using verification information associated with the second container image to verify an integrity of the second container image. In an operation 470, a log associated with the second container image may be checked to verify a provenance of the second container image. In an operation 480, the second container may be instantiated from the second container image by loading a file system associated with the second container image. As described herein, in some examples, operation 480 may instantiate the second container in response to a positive verification of the integrity of the second container image in operation 460 and in response to a positive verification of the provenance of the second container image in operation 470.

The foregoing disclosure describes a number of example embodiments for instantiating containers. The disclosed examples may include systems, devices, computer-readable storage media, and methods for execution of services in containers. For purposes of explanation, certain examples are described with reference to the components illustrated in FIGS. 1-4. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A non-transitory computer-readable storage medium, comprising a set of instructions that, when executed, cause a processor to:
   verify an integrity of a container image by executing a verification program using verification information associated with the container image;
   verify a provenance of the container image by checking a log associated with the container image;
   in response to a positive verification of the integrity of the container image and a positive verification of the provenance of the container image, instantiate a container from the image container image by loading a file system associated with the container image, wherein the file system associated with the container image is isolated from the verification information and the log;
   copy the container image to a second container image, wherein the container image comprises a file system hierarchy;
   verify an integrity of the second container image by executing the verification program using verification information associated with the second container image;
   verify a provenance of the second container image by checking a log associated with the second container image; and
   instantiate a second container from the second container image by loading a file system associated with the second container image, wherein the file system associated with the second container image is isolated from the verification information and the log for the second container image.

2. The non-transitory storage medium of claim 1, wherein the verification program is executed by a second processor.

3. The non-transitory storage medium of claim 1, further comprising instructions to verify the integrity of the container after the container has been instantiated.

4. The non-transitory storage medium of claim 1, wherein the second container is isolated from the container.

5. The non-transitory storage medium of claim 1, wherein the verification program is to take a cryptographic hash of a file in the container image and verifying it with a database of correct hashes.

6. The non-transitory storage medium of claim 1, further comprising instructions to cause the processor to prevent modifying the verification information and the log.

7. The non-transitory storage medium of claim 1, wherein the container image is stored in a distributed storage system comprising multiple storage nodes.

8. A computing device, comprising a processor and a non-transitory computer-readable storage medium, the storage medium comprising instructions that, when executed, cause the processor to:
receive a prompt to instantiate a container from a container image, the container image comprising a file hierarchy;
execute a verification program to verify an integrity of the container image using verification information associated with the container image;
check a log associated with the container image to verify a provenance of the container image;
in response to a positive verification of the integrity of the container image and a positive verification of the provenance of the container image, instantiate the container from the container image by loading a file system for the container, wherein the file system for the container is isolated from the verification information and the log;
copy the container image to a second container image;
execute the verification program to verify an integrity of the second container using verification information associated with the second container image;
check a log associated with the second container image to verify a provenance of the second container; and
in response to a positive verification of the integrity of the second container and a positive verification of the provenance of the second container, instantiate the second container from the second container image by loading a file system for the second container, wherein the file system for the second container is isolated from the verification information and the loci for the second container image.

9. The computing device of claim 8, wherein the storage medium further comprises instructions that cause the processor to verify the integrity of the container after the container has been instantiated.

10. The computing device of claim 8, wherein the second container is isolated from the container.

11. The computing device of claim 8, wherein the verification program is to take a cryptographic hash of a file in the container image and verifying it with a database of correct hashes.

12. The computing device of claim 8, wherein the processor is to prevent modifying the verification information and the log.

13. The computing device of claim 8, wherein the container image is stored in a distributed storage system comprising multiple storage nodes.

14. A method for execution by a processor, comprising:
receiving a prompt to instantiate a container from a container image, the container image comprising a file hierarchy;
executing a verification program to verify an integrity of the container image using verification information associated with the container image, wherein the verification program is to take a cryptographic hash of a file in the container image and verifying it with a database of correct hashes;
checking a log associated with the container image to verify a provenance of the container image; and
in response to a positive verification of the integrity of the container image and a positive verification of the provenance of the container image, instantiating the container from the container image by loading a file system for the container, wherein the file system is isolated from the verification information and the log;
copying the container image to a second container image;
executing a verification program to verify an integrity of the second container image using verification information associated with the second container image;
checking a log associated with the second container image to verify a provenance of the second container image; and
in response to a positive verification of the integrity of the second container image and a positive verification of the provenance of the second container image, instantiating the second container from the second container image by loading a second file system for the second container, wherein the second file system is isolated from the verification information and the loci for the second container image.

15. The method of claim 14, further comprising executing tests of services in the container.

16. The method of claim 14, wherein the processor is unable to modify the verification information and the log.

* * * * *